(12) United States Patent
Ikeda

(10) Patent No.: US 6,877,589 B2
(45) Date of Patent: Apr. 12, 2005

(54) DRUM BRAKE DEVICE WITH AN AUTOMATIC SHOE CLEARANCE ADJUSTMENT APPARATUS

(75) Inventor: Takashi Ikeda, Owariasahi (JP)

(73) Assignee: Nisshinbo Ind. Inc., Tokyo (JP)

( * ) Notice: Subject to any disclaimer, the term of this patent is extended or adjusted under 35 U.S.C. 154(b) by 53 days.

(21) Appl. No.: 10/401,815

(22) Filed: Mar. 27, 2003

(65) Prior Publication Data

US 2003/0183465 A1 Oct. 2, 2003

(30) Foreign Application Priority Data

Mar. 27, 2002 (JP) .................................... 2002-089026

(51) Int. Cl.[7] ............................................. F16D 51/00
(52) U.S. Cl. ................................................. 188/79.52
(58) Field of Search ......................... 188/79.52, 79.51, 188/79.63

(56) References Cited

U.S. PATENT DOCUMENTS

| | | | | |
|---|---|---|---|---|
| 3,983,970 A | * | 10/1976 | Courbot .................... | 188/79.52 |
| 4,390,086 A | * | 6/1983 | Conrad ..................... | 188/79.52 |
| 4,476,963 A | * | 10/1984 | Palmer et al. ............ | 188/79.52 |
| 4,706,783 A | * | 11/1987 | Rath et al. ................ | 188/79.52 |
| 4,706,784 A | * | 11/1987 | Shellhause ............... | 188/79.52 |
| 4,729,457 A | * | 3/1988 | Cousin et al. ............ | 188/79.52 |
| 4,804,072 A | * | 2/1989 | Michoux et al. ......... | 188/79.52 |
| 4,938,320 A | * | 7/1990 | Hyde et al. ............... | 188/79.52 |
| 5,246,090 A | * | 9/1993 | Quere et al. .............. | 188/79.52 |
| 5,343,987 A | * | 9/1994 | Varzescu .................. | 188/79.63 |
| 6,196,360 B1 | * | 3/2001 | Iizuka et al. .............. | 188/79.52 |
| 6,397,984 B1 | * | 6/2002 | De Andreis et al. ..... | 188/79.52 |
| 6,508,339 B1 | * | 1/2003 | Asai et al. ................ | 188/79.52 |

* cited by examiner

Primary Examiner—Benjamin A. Pezzlo
(74) Attorney, Agent, or Firm—Apex Juris, pllc; Tracy M Heims

(57) ABSTRACT

A drum brake device prevents shoe clearance overadjustment by means of a thermo-sensitive member with a lower leg opening force and provides a smaller thermo-sensitive member with a lower cost. A portion between both ends of the brake lever (50) in a direction of crossing the shoe return inhibitor (61) engages with one end of the shoe return inhibitor (61) automatically restricting the return position of the pair of brake shoes (20) and (30); the proximate portion (50a) of the brake lever (50) is pivotally supported on the brake shoe (20); and the free end (50b) side of the brake lever (50) is supported at the brake shoe (20) via the thermo-sensitive member (70).

4 Claims, 12 Drawing Sheets

DRUM BRAKE DEVICE WITH AN AUTOMATIC SHOE CLEARANCE ADJUSTMENT APPARATUS

BACKGROUND OF THE INVENTION

1. Field of the Invention

This invention relates to a drum brake device with an automatic shoe clearance adjustment apparatus, and, more particularly, to a shoe clearance over-adjustment prevention means which suspends automatic shoe clearance adjustment when the temperature within the brake increases and exceeds a predetermined range.

2. Description of Related Art

Generally, a drum brake has an automatic shoe clearance adjustment apparatus compensate wear of the brake shoe lining in order to maintain a certain shoe-to-drum clearance.

If the drum brake is repeatedly applied, for example, where if a vehicle is driving down a long downward slope, the temperature of the brake drum increases and thereby expanding the brake drum to cause an apparent shoe-to-drum clearance enlargement, i.e., a temporary enlargement of the shoe-to-drum clearance to the extent of brake drum expansion.

While the drum brake is expanding, if the automatic shoe clearance adjustment apparatus is configured such that an automatic shoe clearance adjustment functions to adjust the shoe-to-drum clearance, temporarily enlarged because of the brake drum expansion, when the brake drum is cooled and the temperature thereof decreases, this shrinks the brake drum and causes it to return to its normal state, the shoe-to-drum clearance already adjusted during the temporary brake drum expansion remains the same and this can be considered an over-adjustment and may possibly cause a dragging problem.

If the shoe-to-drum clearance in a normal state (not in a use under a predetermined high-temperature) is preset to be wider in order to avoid dragging, a shoe clearance over-adjustment could be prevented, but strokes, such as a brake pedal stroke and a brake lever stroke, become larger and this then causes a delay in the braking effect and gives the driver a disconcerting brake feeling.

As an example of technology to resolve the above problems, for example, the Japanese Patent Publication No. 58-49739 discloses a drum brake with a shoe clearance over-adjustment prevention means.

An incremental type automatic shoe clearance adjustment apparatus employed in the drum brake of this conventional art is equipped with a shoe clearance adjustment strut which is composed of two, axially detachable members (e.g., a tube and a nut) and a bimetal strip, component of a shoe clearance over-adjustment prevention means, put therebetween.

In the structure disclosed in the above-conventional art, the shoe clearance over-adjustment means cannot be used in most other types of automatic shoe clearance adjustment apparatus, such as one-shot type. It may, however, be used in the incremental type.

An invention relating to the Japanese Patent Application No. 2000-297651 (Provisional Patent Publication JP-2002-106620-A equivalent to US-2000-0036123-A) was filed by Applicant of this invention.

A shoe clearance over-adjustment prevention means of the drum brake in this second conventional art provides a thermo-sensitive member either between a shoe clearance adjustment strut and a brake shoe or between the shoe clearance adjustment strut and a brake lever.

The shoe clearance over-adjustment prevention means in the structure of the second conventional art can be employed in a one-shot type automatic shoe clearance adjustment apparatus. Therefore, the second conventional art provides an excellent applicability in this regard.

A typical one-shot type automatic shoe clearance adjustment apparatus comprises a shoe clearance adjustment strut having a strut body, a bell crank adjustment lever, a pin pivoting the adjustment lever on the strut body, a second spring, and a first spring extended between the strut body and first brake shoe. If the amount of outward movement of a pair of brake shoes during the wheel cylinder operation exceeds a predetermined distance, the strut body follows the first brake shoe and a brake lever because of a force of the first spring, and the second brake shoe acts on the adjustment lever to move an engagement position between the adjustment lever and the strut body so as to extend an entire length of the shoe clearance adjustment strut, thereby automatically adjusting a shoe-to-drum clearance.

The shoe clearance over-adjustment prevention means is characterized in that a thermo-sensitive member is folded thereby creating a folded section and two legs extending therefrom to be folded and facing each other, forming a superposed portion, is inserted between the strut body and the brake lever and that-when the service brake operates and the temperature in the brake drum increases and the temperature of the thermo-sensitive member exceeds the predetermined range, the superposed portion of the thermo-sensitive member opens and moves outward to spread the two legs apart from each other against a force of the first spring so as to move the shoe clearance adjustment strut to follow the second brake shoe suspending the automatic shoe clearance adjustment, thereby preventing the over-adjustment.

In the above-described shoe clearance over-adjustment prevention means, the thermo-sensitive member requires the force be more than the spring force of the first spring because the superposed portion of the thermo-sensitive member is positioned close to the first spring. Therefore, the thermo-sensitive member needs to be made from a thicker material and must have a wider design.

Accordingly, weight of the thermo-sensitive member inevitably increases, thereby increasing the cost thereof.

SUMMARY OF THE INVENTION

This invention was made to improve the above-points and is to provide a drum brake with a shoe clearance over-adjustment prevention means, which prevents the shoe clearance over-adjustment because of a lower opening force of the thermo-sensitive member and achieves the objects because of a smaller thermo-sensitive member with a lower cost.

In order to achieve the above-objects, this invention provides a drum brake device with an automatic shoe clearance adjustment apparatus comprising: a pair of brake shoes facing each other; a service brake actuator positioned between first adjacent ends of the brake shoes; a shoe return inhibitor, for restricting return positions of the brake shoes, positioned adjacent to the service brake actuator and extended between the brake shoes, the shoe return inhibitor automatically displaces the return positions of the brake shoes in the outward direction of the brake shoes when an extent of the outward movement of the brake shoes during the service brake operation exceeds a predetermined distance, wherein a lever element is pivotally supported at first brake shoe in a crossing direction relative to the shoe return inhibitor, one end of the shoe return inhibitor functionally engaging with a position of the lever element between a pivoting section and a free end of the lever element while the free end side of the lever element is supported by the first brake shoe via a thermo-sensitive member; and when the service brake is activated and the temperature of the thermo-sensitive member reaches the predetermined range, a rotational force is applied to the lever element because of a thermo-deformation of the thermo-sensitive member which makes the shoe return inhibitor follow an outward movement of second brake shoe so as to suspend an automatic shoe clearance adjustment.

The lever element is a brake lever for parking brake operation or a radial contraction lever. The radial contraction lever supported by the first brake shoe via a supporting member at a free end thereof is provided for contracting the pair of brake shoes because of releasing the supporting member.

This invention may provide a drum brake device with an automatic shoe clearance adjustment apparatus comprising: a pair of brake shoes facing each other; a service brake actuator positioned between first adjacent ends of the brake shoes; a shoe return inhibitor, for restricting return positions of the brake shoes, positioned adjacent to the service brake actuator and extended between the brake shoes, the shoe return inhibitor automatically displaces the return positions of the brake shoes in the outward direction of the brake shoes when an extent of the outward movement of the brake shoes during the service brake operation exceeds a predetermined distance, wherein a brake lever is pivotally supported at first brake shoe in a crossing direction relative to the shoe return inhibitor, one end of the shoe return inhibitor functionally engaging with a position of the brake lever between a pivoting section and a free end of the brake lever while the free end side of the brake lever is supported by a cable end of a brake cable via a thermo-sensitive member; and when the service brake is activated and the temperature of the thermo-sensitive member reaches the predetermined range, a rotational force is applied to the brake lever because of a thermo-deformation of the thermo-sensitive member which makes the shoe return inhibitor follow an outward movement of second brake shoe so as to suspend an automatic shoe clearance adjustment.

The drum brake as structured above, arranging (positioning) the thermo-sensitive member at the free end side of the lever allows setting an opening force (force to move two legs of the thermo-sensitive member apart from each other) lower to the magnitude apportioned by the lever-ratio at the position of the thermo-sensitive member, thereby enabling a smaller design for the thermo-sensitive member, thus minimizing material and thereby reducing the cost thereof.

The lever may be the brake lever for parking brake operation or the radial contraction lever for radial contraction of the pair of the brake shoes because of releasing the supporting member, thereby broadening the applicability thereof to a variety of drum brakes. The automatic shoe clearance adjustment apparatus at least has the shoe return inhibitor, for restricting the return positions of the brake shoes and automatically displaces the brake shoes outward in the direction to move themselves apart from each other.

Further, the thermo-sensitive member may be made from a bimetal or a shape memory alloy member, which gives a wider range of material selections depending upon specifications requested.

BRIEF DESCRIPTION OF THE DRAWINGS

The above and other objects and advantages of the present invention will become readily apparent by reference to the following detailed description when considered in conjunction with the accompanying drawings.

DETAILED DESCRIPTION OF THE PREFERRED EMBODIMENTS

Figure 1:
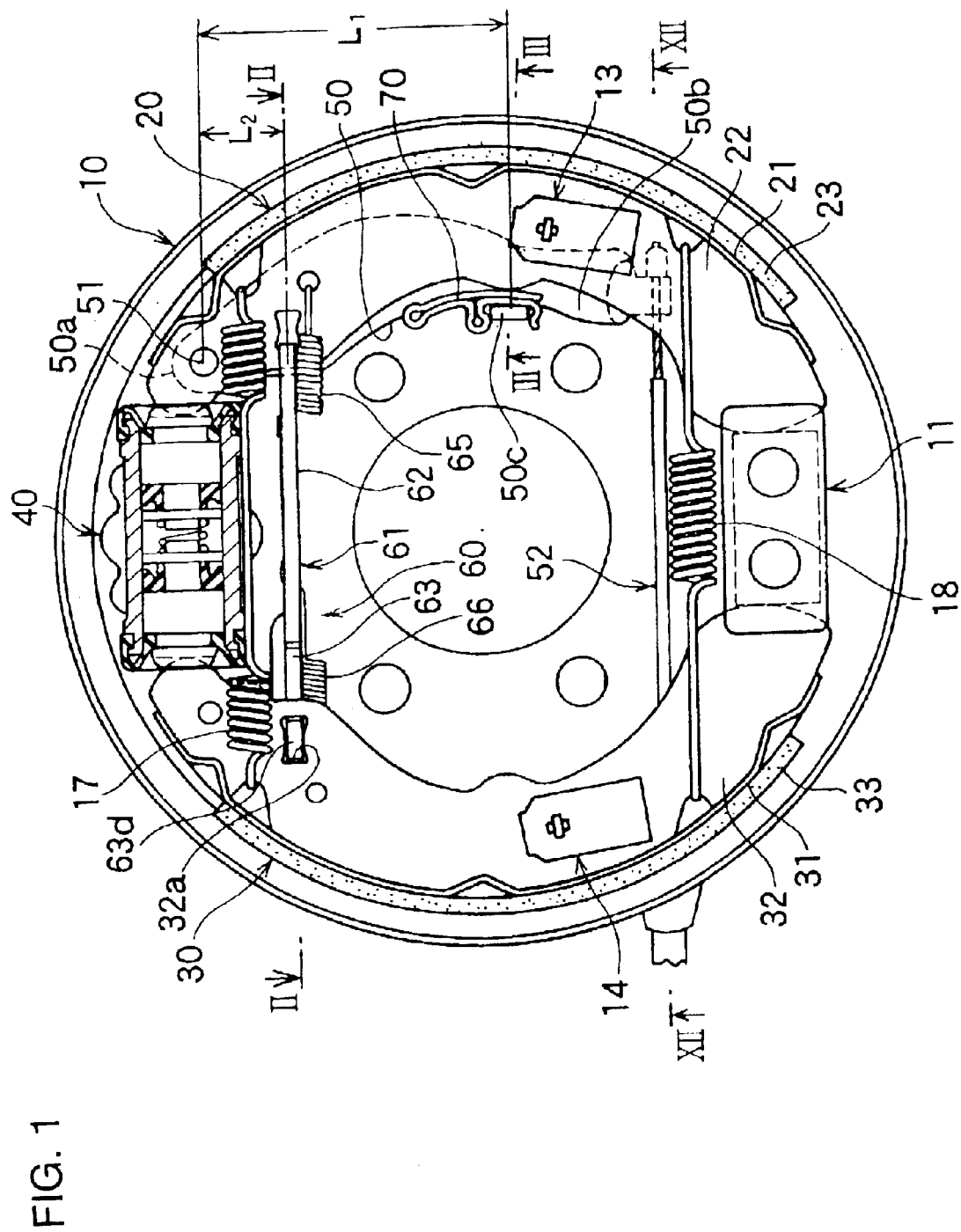
FIG. 1 is an outboard elevational view of the dual mode drum brake as to Example 1 of this invention.

Examples of a drum brake device relating to this invention are explained below.

Example 1 will be explained with reference to FIGS. 1–4.

A pair of facing brake shoes 20, 30, each makes a T-shape in cross-section as a shoe rim 21 and a shoe web 22 combined together while a shoe rim 31 and a shoe web 32 combined together, and linings 23, 33 are affixed on peripheral surfaces of the shoe rim 23, 33 respectively.

Every one of the brake shoes 20, 30 is slidably supported on a back plate 10 which is fixed on a stationary portion of a vehicle by means of shoe-hold mechanisms 13, 14.

Upper adjacent ends of the shoe webs 22, 32 functionally engage with a wheel cylinder 40 fixed on the back plate 10, and lower adjacent ends of the shoe webs 22, 32 are supported by an anchor block 11 fixed on the back plate 10.

A brake lever 50 as a parking brake actuator is superposed on the shoe web 22 of the right brake shoe 20 as shown in FIG. 1.

The brake lever 50 is designed to be a plate-like member and such that a proximal portion 50a of the brake lever 50 is pivotally supported at an upper end of the shoe web 22 around a pin 51 and that a free end 50b near the anchor block 11 is connected with a brake cable 52 functioning as a remote-control force transmitting member.

The brake lever 50 is also bent to form a stopper 50c at a brake inner side near the free end 50b, parallel to an inner end surface of the shoe web 22.

Figure 4:
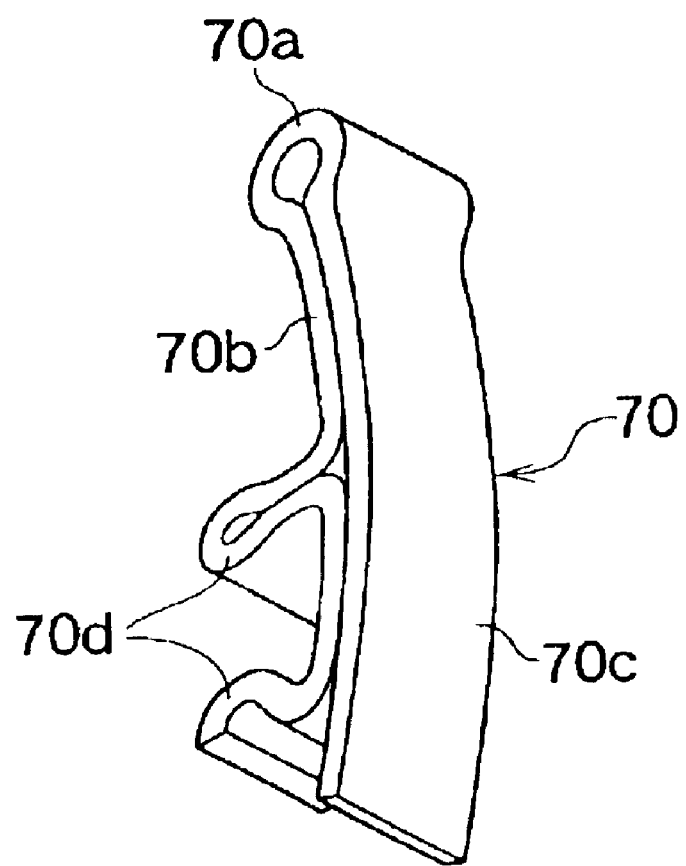
FIG. 4 is an enlarged isometric view explaining the thermo-sensitive member of the Example 1 of this invention.

A thermo-sensitive member 70 has a double-folded-leg section, forming a superposed portion which is to be inserted between the stopper 50c and an inner facing surface of the shoe web 22 as shown in FIG. 4 so as to restrict a return position of the brake lever 50.

The thermo-sensitive member 70 of this example is a single-piece strip of a bimetal or a shape memory alloy formed by press. This bimetal or shape memory alloy is formed into a first leg 70b and a second leg 70c extending from a folded section 70a to meet each other and are superposed on one another.

An end of the first leg 70b is curved to form a C-shape clip portion 70d, and the stopper 50c resiliently fits therein.

The thermo-sensitive member 70 may fit on the shoe web 22 instead of the brake lever 50.

In FIG. 1, an upper shoe return spring 17 is positioned adjacent to the wheel cylinder 40 while a lower shoe return spring 18 is positioned adjacent to the anchor block 11. The upper and lower shoe return springs 17 and 18 stretch between the pair of brake shoes 20 and 30 so as to urge the brake shoes 20 and 30 to approach each other. The shoe clearance adjustment strut 61 functioning as a shoe return inhibitor for adjusting a shoe-to-drum clearance is extended adjacent to the wheel cylinder 40 between the shoe web 32 and the brake lever 50.

The shoe clearance adjustment strut 61 restricts the return positions of the pair of brake shoes 20 and 30 around a point of abutment with the anchor block 11.

The shoe clearance adjustment strut 61 comprises a plate-like strut body 62, an adjustment lever 63, a pin 64, a second spring 66, and a first spring 65 is added to the shoe clearance adjustment strut 61 to constitute the automatic shoe clearance adjustment apparatus 60.

Figure 2:
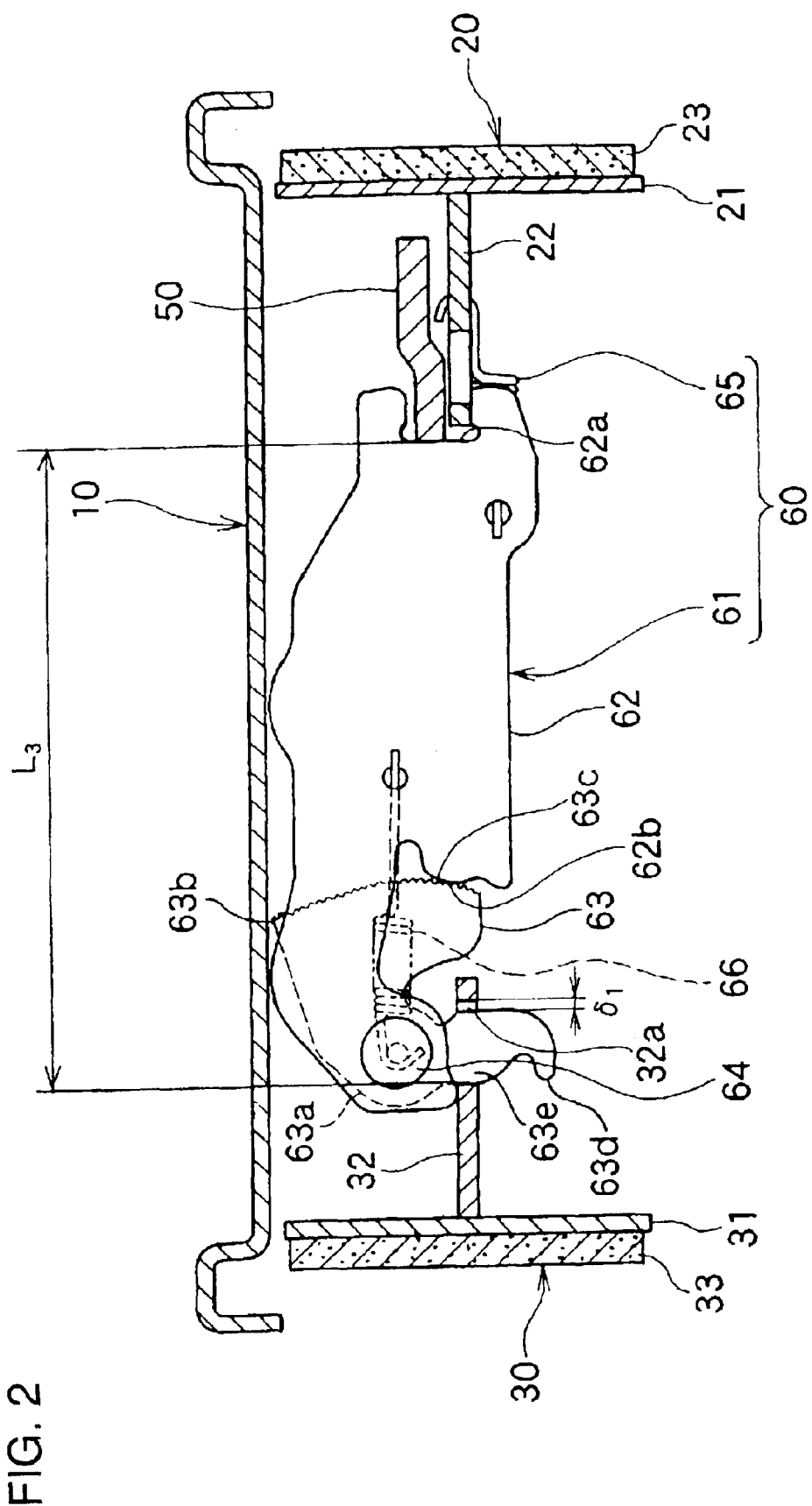
FIG. 2 is a cross-section view of FIG. 1 taken along the line II—II.

The strut body 62 has a notched groove 62a formed at a right side of FIG. 2 holding the brake lever 50 and the shoe web 22 therein, and a bottom surface of the groove of the notched groove 62a abuts against the brake lever 50 restricting the return position of the brake shoe 20.

Second small teeth 62b are formed at left side between both ends of the strut body 62, and an upper side portion above the second small teeth 62b in FIG. 2 is bent to form a board thickness stepped portion extending toward the left as shown in FIG. 1

A proximal portion 63a of the adjustment lever 63 is pivotally supported around the left end of the strut body 62 by the pin 64 and is also movable along a longitudinal plate surface of the strut body 62 or in a direction of the outward movement of the left brake shoe 30, and a first small teeth 63c formed on an arcuate end surface of an arm 63b at one side of the adjustment lever 63 engage with a second small teeth 62b of the strut body 62.

The other arm 63b has a cam 63e, and the cam 63e abuts against an inner surface of a rectangular hole 32a facing outside of the brake to restrict the return position of the brake shoe 30 and positioned in the rectangular hole 32a with a small predetermined gap $\delta_1$ from an inner surface of the rectangular hole 32a at a brake center side.

The first spring 65 is stretched between the shoe web 22 and the strut body 62 while the second spring 66 is stretched between the strut body 62 and the pin 64 affixed on the adjustment lever 63, both arranged such that a force of the first spring 65 is larger than that of the second spring 66.

The automatic shoe clearance adjustment operation of the above-disclosed structure is explained with reference to FIGS. 1 and 2.

When both brake shoes 20 and 30 move to spread out because of the service brake operation, the strut body 62 follows the brake shoe 20 because of the spring force of the first spring 65.

If linings 23, 33 are worn out, then the amount of the outward movement of the pair of the brake shoes 20 and 30 exceeds a gap $\delta_1$ between a rectangular hole 32a of the left shoe web 32 and the cam 63e plus the height of an engagement section between the first small teeth 63c and the second small teeth 62b, the adjustment lever 63 rotates corresponding to one tooth pitch of the first teeth 63c, and a point of abutment between the rectangular hole 32a and a cam surface of the cam 63e is changed. Accordingly, a distance $L_3$ from the cam surface of the cam 63e supporting the rectangular hole 32a to the bottom of the groove in the notched groove 62a supporting the brake lever 50 is automatically lengthened, thereby maintaining a constant shoe-to-drum clearance.

Operation of the shoe clearance over-adjustment prevention means will be explained next.

When automatic shoe clearance adjustment is in operation, if the temperature of the thermo-sensitive member 70 reaches the predetermined range, two legs of the thermo-sensitive member 70 tend to move apart from each other to be in an almost V-shape against the spring force of the first spring 65.

If the service brake is applied under this situation, the force on the two legs of the thermo-sensitive member 70 moves the brake lever 50 forward and simultaneously integrally makes the strut body 62 and the adjustment lever 63 follow the brake shoe 30, thereby stopping the automatic shoe clearance adjustment operation and preventing the over-adjustment thereof.

At this stage, if a distance $L_2$ is defined as a distance from a horizontal line passing the center of the pin 51 to a horizontal line passing a point where the brake lever 50 presses the strut body 62 and a distance $L_1$ is defined as a distance from a horizontal line passing the center of the pin 51 to a horizontal line passing an operational point where the thermo-sensitive member 70 urges the brake lever 50, the force on the two legs of the thermo-sensitive member 70 in FIG. 1 at least needs to be stronger than a force multiplied by the spring force of the first spring 65 by $L_2/L_1$.

As a result, the thickness of the material of the thermo-sensitive member 70 may be thinner; the width thereof may be smaller; and the weight thereof may be lighter, thereby reducing the cost of the thermo-sensitive member 70.

In the following section, Example 2 of the present invention applying a shoe clearance over-adjustment means to an automatic shoe clearance adjustment apparatus employing the same basic structure as in the Japanese Patent Publication No. 43-21822 will be explained with reference to FIGS. 5–8.

In Example 2, except for the automatic shoe clearance adjustment apparatus 80 and a thermo-sensitive member 71, the same reference numbers used in Example 1 will be assigned to identical parts or sites having the same functions as described in Example 1, and the explanation of the structure and the operation regarding the parts or sites will be omitted here.

A shoe clearance adjustment strut 81, functioning as the shoe return inhibitor, comprises a strut body 82, an adjustment lever 83, a pawl member 85, two pins 84 and 86, and a second spring 88. An automatic shoe clearance adjustment apparatus 80 comprises the shoe clearance adjustment strut 81 and the first spring 87.

Figure 5:
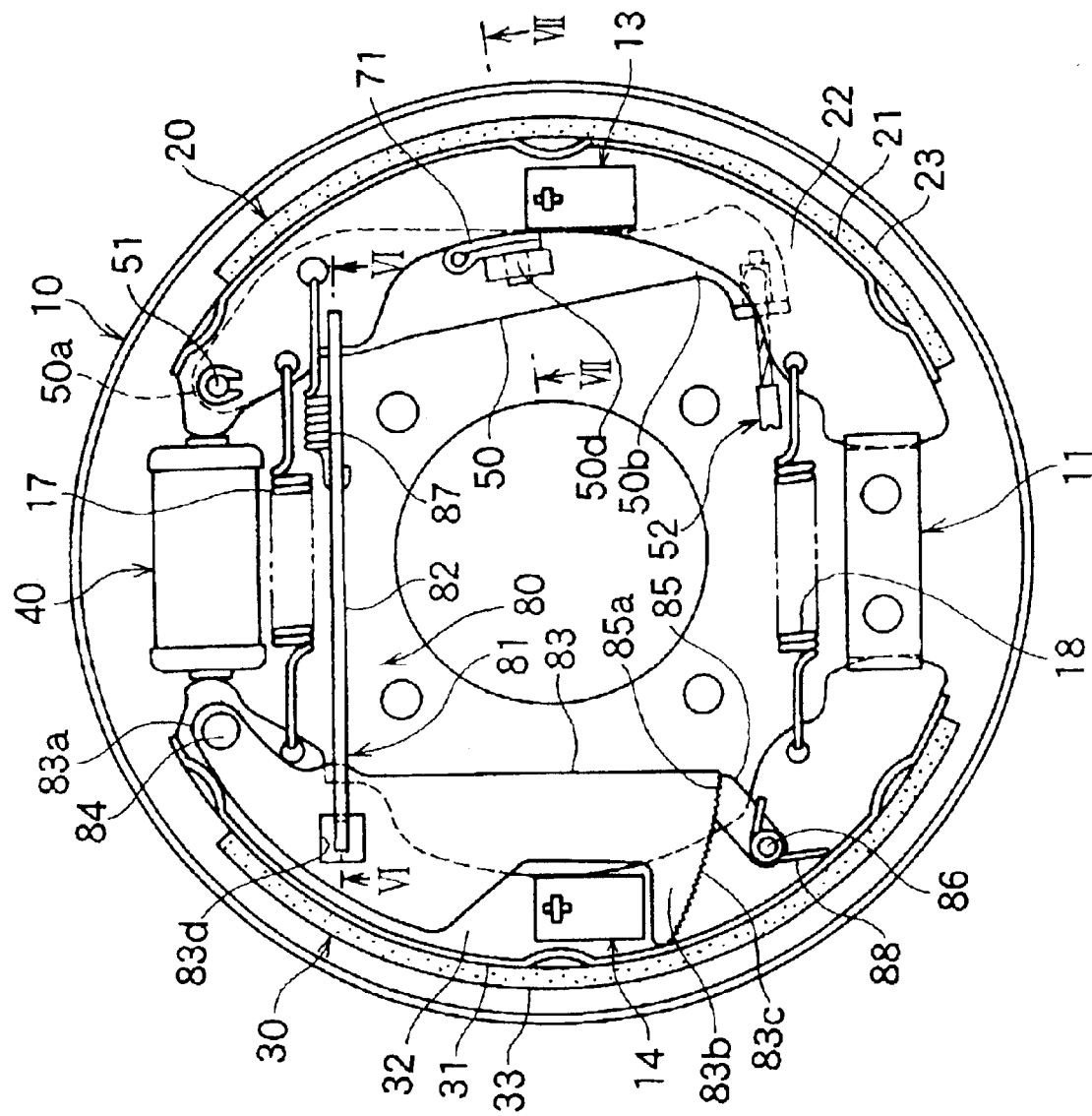
FIG. 5 is an outboard elevational view of the drum brake as to Example 2 of this invention.

In FIG. 5, the adjustment lever 83 is superposed on the shoe web 32 of the left brake shoe 30, and a proximal portion 83a is pivotally supported around the upper end of the shoe web 32 by the pin 84, wherein third small teeth 83c are formed on an arcuate end surface on a free end 83b of the adjustment lever 83 extending toward the lower side of the shoe web 32.

In order to allow a counterclockwise rotation of the adjustment lever 83, fourth small teeth 85a formed on the pawl member 85 pivotally supported around the shoe web 32 by the pin 86 engages with the third small teeth 83c of the adjustment lever 83, and the pawl member 85 is urged by the torsion coil or second spring 88 mounted on the pin 86 in a direction that the fourth small teeth 85a engages therewith.

Figure 6:
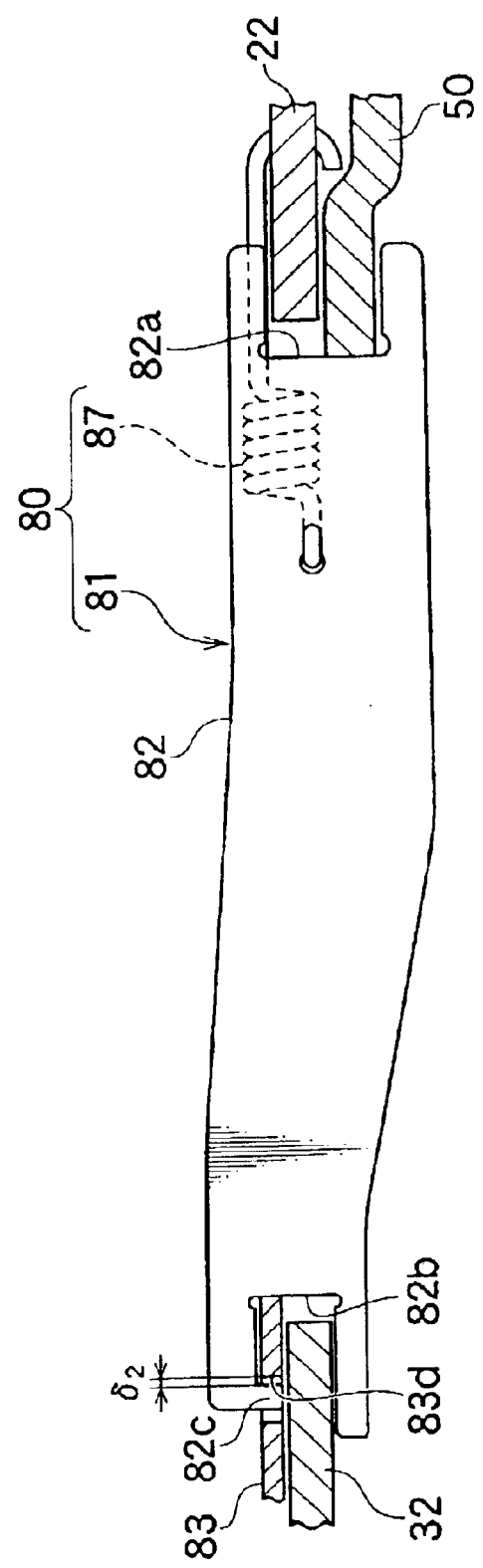
FIG. 6 is a cross-section view of FIG. 5 taken along the line VI—VI.

As shown in FIG. 6, the plate strut body 82 provided adjacent and parallel to the wheel cylinder 40 is designed such that a notched groove 82a, formed at the right end thereof, receives a portion between both ends of the brake lever 50 and the shoe web 22 and that the bottom of the groove in the notched groove supports the brake lever 50. Also, a first spring 87 is stretched between the strut body 82 and the shoe web 22.

A notched groove 82b, formed on the left end of the strut body 82, receives and freely engages a portion between both end of the adjustment lever 83 and the shoe web 32, wherein the bottom of the groove in the notched groove 82b supports the adjustment lever 83. A hook 82c formed at a top end of the notched groove 82b is designed such that a predetermined gap $\delta_2$ between a brake inner side of a rectangular hole 83d formed on the adjustment lever 83 and the hook 82c and a gap absorbing a manufacturing tolerance of related-parts between a brake outer side of the rectangular hole 83d and the hook 82c exist.

Figure 8:
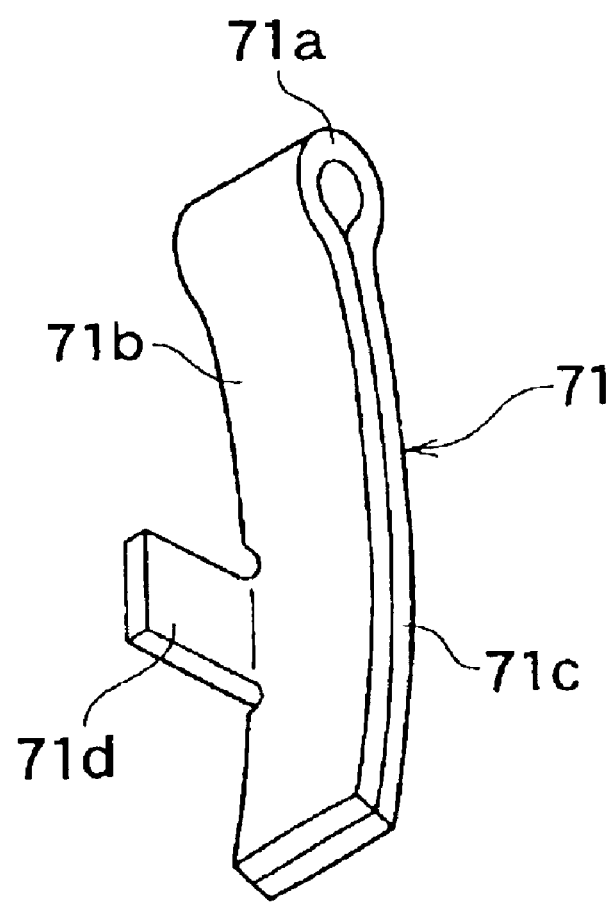
FIG. 8 is an enlarged isometric view explaining the thermo-sensitive member of the Example 2 of this invention.

As shown in an enlarged view of FIG. 8, the thermo-sensitive member 71 is designed such that a first leg 71b and a second leg 71c are extending from a folded portion 71a to face and superpose one another and a fitting piece 71d is integrally formed at an intermediate portion of the first leg 71b to be bent in a right angle to extend away from the second leg 71c.

Figure 7:
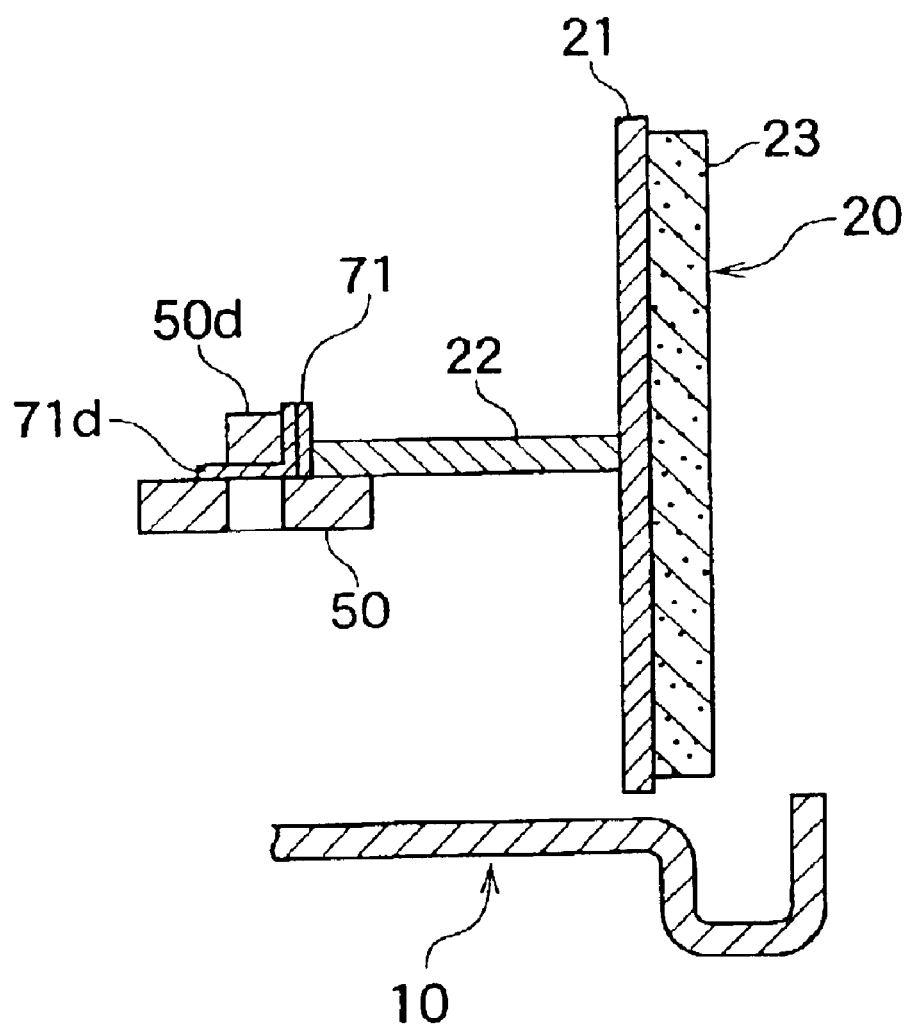
FIG. 7 is a cross-section view of FIG. 5 taken along the line VII—VII.

A bridged stopper 50d is formed, by partial-shearing, in the brake lever 50 at a free end 50b side. As shown in FIG. 7, the superposed portion inserted between the inner end surface of the shoe web 22 and a side surface of the bridged stopper 50d, and the fitting piece 71d is press-fit in a gap simultaneously formed the bridged stopper 50d and passing therethrough.

In the following section automatic shoe clearance adjustment operation will be explained and shoe clearance over-adjustment prevention operation, and the advantages thereof, will be omitted because it is identical or extremely similar to the above-explained structure.

If the service brake is applied while the linings 23, 33 are being worn out, the strut body 82 and the brake lever 50 follows the brake shoe 20 with the spring force of the first spring 87, and the adjustment lever 83 and the pawl member 85 move together with the brake shoe 30. Therefore, the hook 82c of the strut body 82 abuts against the rectangular hole 83d of the adjustment lever 83 to absorb the gap $\beta_2$ and the adjustment lever 83 rotates counterclockwise in FIG. 5 against the spring force of the second spring 88, thereby changing the engaging portion of the third small teeth 83c corresponding to one tooth pitch relative to the small teeth 85a of the pawl section 85.

Accordingly, the practical effective length of the shoe clearance adjustment strut 81 is extended to maintain an approximately constant shoe-to-drum clearance.

Example 3 will be explained with reference to FIGS. 9–11.

A lever element in this example is a radial contraction lever 90 functioning to contract the pair of the brake shoes contrary to the parking lever 50 in the above-described Examples 1 and 2. And the radial contraction lever 90 has the over-adjustment prevention means.

An automatic shoe clearance adjustment apparatus in Example 3 has the same fundamental structure described in Example 1, and as in Example 3, the reference number 60 is assigned to the automatic shoe clearance adjustment apparatus of this Example just like Example 1. Further, same reference numbers used in Example 1 will be assigned to identical parts or sites having same functions as described in Example 1, and the explanation of the structure and the operation regarding the parts or sites will be omitted here.

Figure 9:
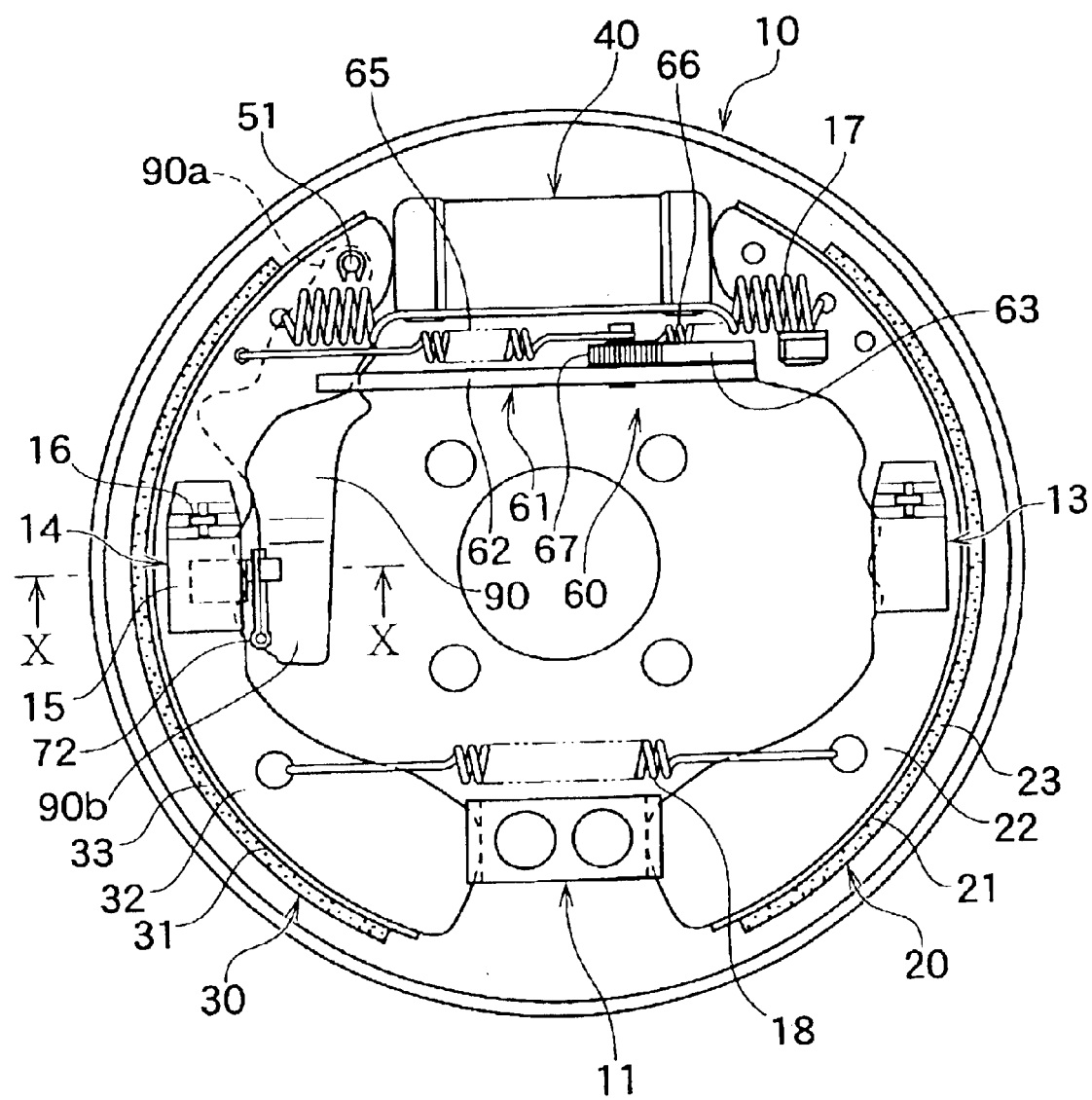
FIG. 9 is an outboard elevational view of the drum brake as to Example 3 of this invention.

In FIG. 9, the plate-like radial contraction lever 90 is superposed on the shoe web 32 of the left brake shoe 30, and a proximal portion 90a is pivotally supported around the upper end of the shoe web 32 by the pin 51, wherein a free end 90b of the radial contraction lever 90 is supported by the shoe web 32 via a superposing section of a thermo-sensitive member 72 and a tongue strip 15b (cited in FIG. 10) of a shoe hold spring 15.

Figure 10:
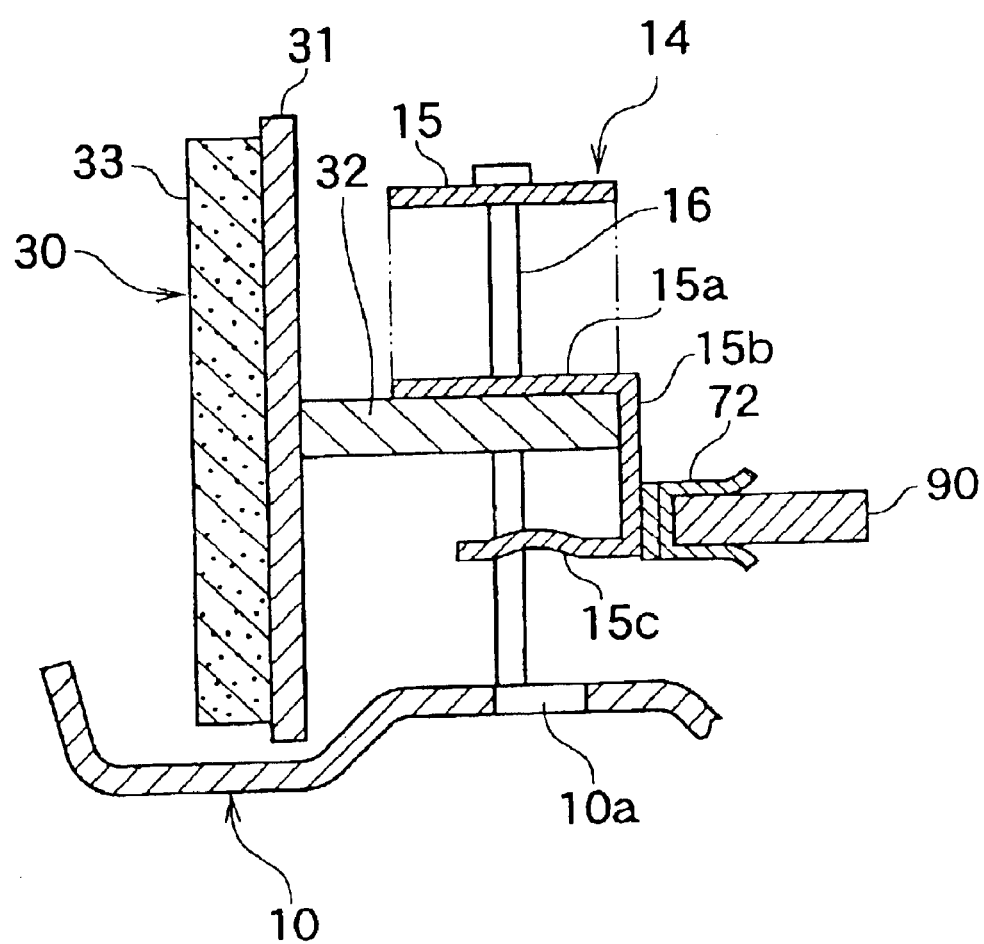
FIG. 10 is a cross-section view of FIG. 9 taken along the line X–X.

The shoe hold spring 15 is a plate spring in almost U-shape which is designed as shown in FIG. 10 to comprise a contacting strip 15a attaching an upper surface of the shoe web 32, a tongue strip 15b extended in an almost right angle from the brake inner side of the contacting strip 15a having a surface at a brake outer side abutting against an inner end surface of the shoe web 32, and a facing strip 15c extended in an almost right angle from the brake outer side of the tongue strip 15b in parallel to a lower surface of the shoe web 32 with a space therebetween, thereby forming an almost U-shaped in cross-section by means of the contacting strip 15a, the tongue strip 15b and the facing strip 15c.

Figure 11:
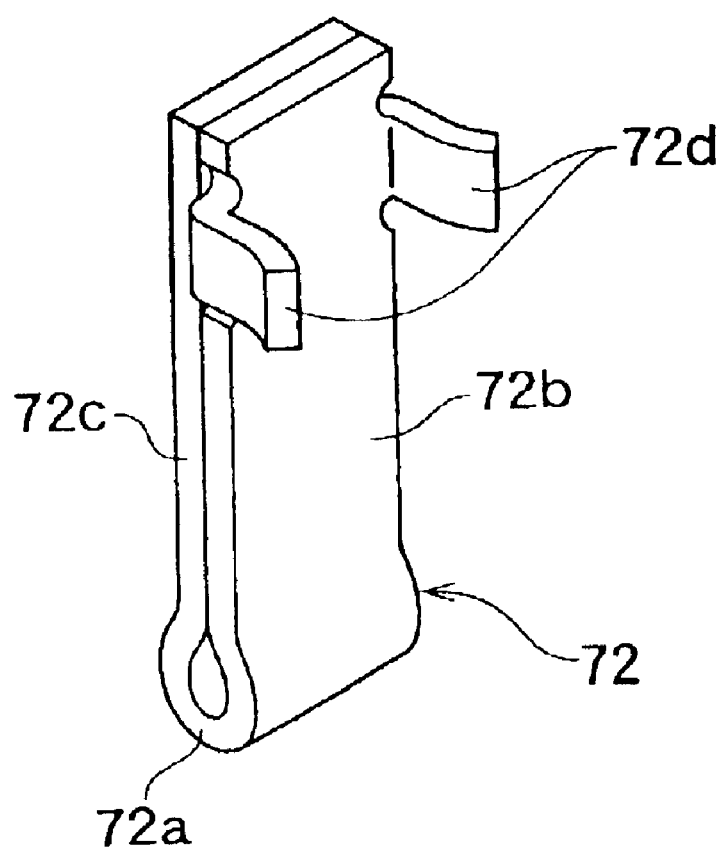
FIG. 11 is an enlarged isometric view explaining the thermo-sensitive member of the Example 3 of this invention.

As shown in an enlarged view of FIG. 11, the thermo-sensitive member 72 is designed such that a first leg 72b and a second leg 72c are extending from the folded portion 72a to face and superpose each other and clipping strips 72d where 72d are integrally positioned upper portions of the first leg 72b to be bent in a right angle to extend from both sides thereof opposite toward the second leg 72c, thereby forming almost C-shaped cross-section.

As shown in FIG. 10, the superposed portion of the thermo-sensitive member 72 is inserted between the free end 90b (not cited in FIG. 10) of the radial contraction lever 90 and an outer surface of the tongue strip 15b of the shoe hold spring 15, and the hooking strips 72d, 72d catch the radial contraction lever 90.

The automatic shoe clearance adjustment apparatus 60 of this example is positioned laterally symmetrical to the automatic shoe clearance adjustment apparatus 60 of Example 1, and the shoe clearance adjustment strut 61 is positioned adjacent and parallel to the wheel cylinder 40 and extends between a position between both ends of the radial contraction lever 90 and the brake shoe 20.

Instead of the small teeth 62b on the strut body 62 engaging with the adjustment lever 63 of Example 1, an additional toothed member 67 may be fixed on the strut body 62, and one of hooking portions of the first spring 65 and the second spring 66 are both hooked on the toothed member 67.

In the following section, a process of enlarging the shoe-to-drum clearance between the brake drum and the pair of brake shoes 20, 30 will be explained, and the automatic shoe clearance adjustment operation and over-adjustment prevention operation and advantage thereof will be omitted because it is identical or extremely similar to the above-explained structure.

If the shoe-to-drum clearance becomes smaller or the frictionally engaging portion of the brake drum (not shown in the figures) with the linings 23, 33 becomes worn outin a stepped shape in cross-section of the brake drum, then, when replacing the brake the brake shoes 20, 30 and rubber parts of the wheel cylinder 40, removing or dismounting the brake drum becomes difficult.

Under this situation, if a stick-like tool such as a screw driver may be inserted from a back plate hole 10a shown in FIG. 10 to push the facing strip 15c of the shoe hold spring 15, opening of the shoe hold spring 15 at upper portion thereof is held by the shoe hold pin 16, and the opening of the shoe hold spring 15 is pressed and inclines around a point of abutment between the shoe web 32 and a tip end of the contacting strip 15a.

Accordingly, the abutment engagement between the tongue 15b and the radial contraction lever 90 is released, and the radial contraction lever 90 moves left in FIG. 9 to enlarge the shoe-to-drum clearance, thereby facilitating the operation of removing the brake drum.

Figure 12:
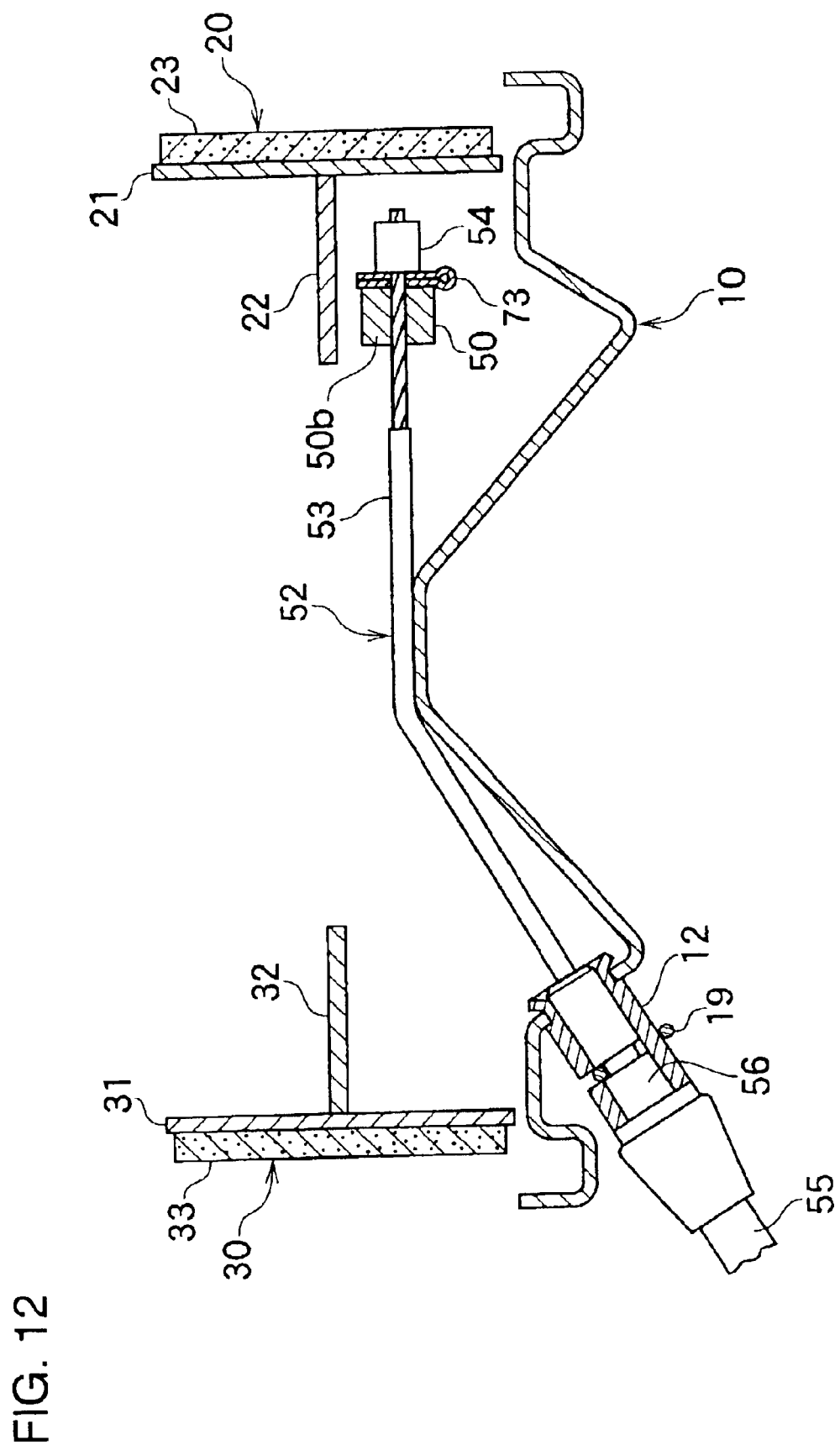
FIG. 12 is a structural view of Example 4 when cross-sections the line XII—XII in FIG. 1.
Figure 1:
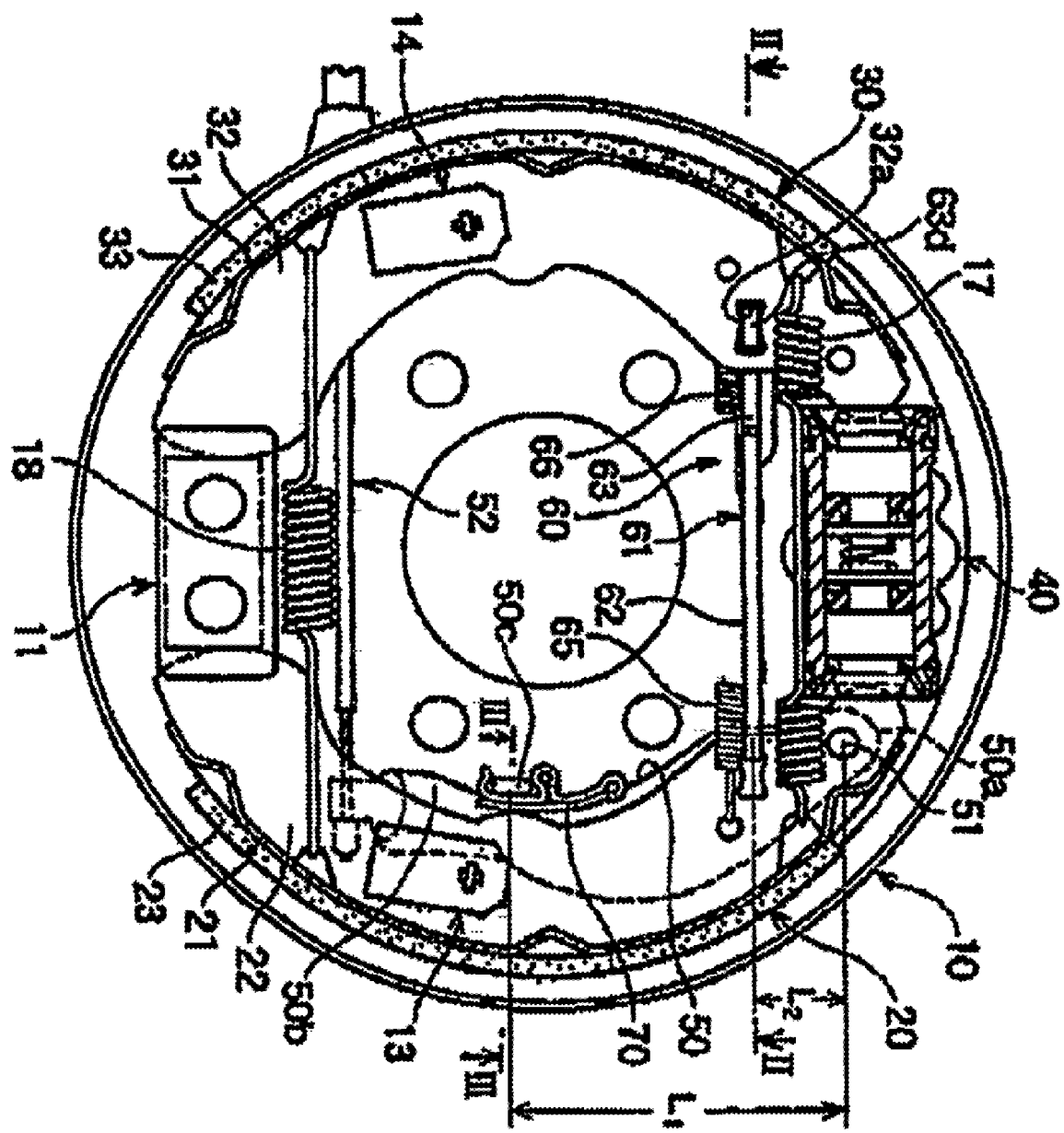

Then, Example 4 of this invention will be explained with reference to FIG. 12. FIG. 12 is a structural cross-section view taken along the line XII—XII of FIG. 1, and therefore the same reference numbers used in Example 1 will be assigned to identical parts or sites having the same functions as described in Example 1, the explanation of which will be omitted here.

A pipe member 12 is fixed at a slope on the left side of the back plate 10 and extends toward the outside of the brake.

The brake cable 52 comprises an inner cable 53, an outer casing 55 and so on.

A casing cap 56 fixed on one end of the outer casing 55 fits in the pipe member 12 to be clipped by a wire spring clip 19. The inner cable 53 slidably positioned within the outer casing 55 has one end inserted in a groove formed at the free end 50b of the brake lever 50 and an end nipple 54 fixed on a top of the inner cable 53 is hooked at the right end side of the free end 50b via a superposed portion of a thermo-sensitive member 73.

A portion of the brake cable 52 between both ends thereof at an outside of FIG. 12 is curved to arrange along a vehicle body such that the other end of the outer casing 55 is fixed on a stationary part of the vehicle and the other end of the inner cable 53 is connected with an operating lever by a driver's seat.

A return position of the brake lever 50 is restricted by the end nipple 54 of the inner cable 53.

The parking brake operation of the above-described structure will be explained with reference to FIG. 1 for the sake of convenience using fundamentally the same structure except for the shoe clearance over-adjustment prevention means.

In FIG. 1, if the inner cable 53 is pulled, the brake lever rotates clockwise and the shoe clearance adjustment strut 61 presses the brake shoe 30 while the pin 51 moves the brake shoe 20 away from the brake shoe 30.

In the above-described structure, if the temperature of the thermo-sensitive member 73 increases to the predetermined range to open two legs during the service brake operation, the free end 50b of the brake lever 50 moves left, thereby suspending the automatic shoe clearance adjustment operation for preventing the over-adjustment.

Lever-ratio at a mounting position of the thermo-sensitive member 73 in this example is greater than Examples 1 and 2 of the above-described invention, reducing the magnitude of leg opening force of the thermo-sensitive member 73.

This invention is not limited to the structures described in Examples 1–4, and for example, the brake lever in Example 2 of this invention may be a radial contraction lever as described in Example 3; and an incremental type automatic shoe clearance adjustment apparatus, in which a shoe clearance adjustment strut having a screw-engagement mechanism may be extended between the lever mounted on one brake shoe and the other brake shoe and the adjustment lever sensing the brake shoe movement and automatically extend an entire length of the shoe clearance adjustment strut, may be employed.

Because of the structure explained above, this invention has the following advantages.

The thermo-sensitive member is arranged at a free end side of the lever element, more particularly, between a point against which the shoe clearance adjustment strut abuts the lever and the free end thereof, or at a connecting point with the brake cable for the parking brake lever, which allows to set an opening force (force to move two legs of the thermo-sensitive member apart from each other) lower to the magnitude apportioned by the lever-ratio at the position, which allows the thermo-sensitive member to design to be smaller, thereby reducing the cost thereof.

At least the lever element is a brake lever for the parking brake operation or a radial contraction lever which functions to enlarge the shoe-to-drum clearance, thereby broadening the applicability thereof to a variety of drum brakes.

At least, the automatic shoe clearance adjustment apparatus, if the amount of the brake shoe movement is more than the predetermined distance, extends the shoe return inhibitor restricting the return position of the brake shoe and automatically moves the return position of the brake shoe to the direction of the outward movement of the brake shoes, thereby broadening the applicability.

Particularly, in the one-shot type automatic shoe clearance adjustment apparatus, although the leg opening force of the thermo-sensitive member is applied larger than the first spring as a component of the one-shot type automatic shoe clearance adjustment apparatus, the leg opening force may be set lower, thereby increasing the effectiveness.

In accordance with the provisions of the patents statues, the principle and mode of operation of this invention have been described and illustrated in its preferred embodiment. However, it must be understood that the invention may be practiced otherwise than as specifically explained and illustrated without departing from the scope or spirit of the attached claims.

What we claim is:

1. A drum brake device with an automatic shoe clearance adjustment apparatus comprising:

a first brake shoe and a second brake shoe facing each other;

a service brake actuator positioned between first adjacent ends of the brake shoes;

a shoe return inhibitor, for restricting return positions of the brake shoes, positioned adjacent to the service brake actuator and extended between the brake shoes, the shoe return inhibitor automatically displaces the return positions of the brake shoes in the outward direction of the brake shoes when an extent of the outward movement of the brake shoes, during the service brake position, exceeds a predetermined distance, wherein a brake lever for parking brake operation is pivotally supported at the first brake shoe in a crossing direction relative to the shoe return inhibitor, one end of the shoe return inhibitor functionally engaging with a position of the brake lever between a pivoting section and a free end of the brake lever while the free end side of the brake lever is supported by the first brake shoe via a thermo-sensitive member; and when the service brake is activated and the temperature of the thermo-sensitive member reaches a predetermined range, a rotational force is applied to the brake lever because of a thermo-deformation of the thermo-sensitive member, thereby making the shoe return inhibitor follow an outward movement at the second brake shoe so as to suspend an automatic shoe clearance adjustment.

2. A drum brake device with an automatic shoe clearance adjustment apparatus comprising:

a first brake shoe and a second brake shoe facing each other;

a service brake actuator positioned between first adjacent ends of the brake shoes;

shoe return inhibitor, for restricting return positions of the brake shoes, positioned adjacent to the service brake actuator and extended between the brake shoes, the shoe return inhibitor automatically displaces the return positions of the brake shoes in the outward direction of the brake shoes when an extent of the outward movement of the brake shoes, during the service brake operation, exceeds a predetermined distance, wherein a radial contraction lever for contracting a diameter of the brake shoes in cooperation with a supporting member, is pivotally supported at the first brake shoe in a crossing direction relative to the shoe return inhibitor, one end of the shoe return inhibitor functionally engaging with a position of the radial contraction lever between a pivoting section and a free end of the radial contraction lever while the free end side of the radial contraction lever is supported by the first brake shoe via a thermo-sensitive member and the supporting member; and when the service brake is activated and the temperature of the thermo-sensitive member reaches a predetermined range, a rotational force is applied to the radial contraction lever because of a thermo-deformation of the thermo-sensitive member, thereby making the shoe return inhibitor follow an outward movement of the second brake shoe so as to suspend an automatic shoe clearance adjustment.

3. The drum brake as claimed in claim 1, wherein the shoe return inhibitor has a small teeth meshing mechanism that allows rotation of the adjustment lever in one direction, and when the outward movement of the brake shoe exceeds the predetermined distance, the adjustment lever rotates and displaces a small teeth meshing section, thereby automatically displacing the return position of the brake shoes in a direction of the outward movement of the brake shoes.

4. The drum brake as claimed in claim 2, wherein the shoe return inhibitor has a small teeth meshing mechanism that allows rotation of the adjustment lever in one direction, and when the outward movement of the brake shoe exceeds the predetermined distance, the adjustment lever rotates and displaces a small teeth meshing section, thereby automatically displacing the return position of the brake shoes in a direction of the outward movement of the brake shoes.

* * * * *

UNITED STATES PATENT AND TRADEMARK OFFICE
CERTIFICATE OF CORRECTION

| | |
|---|---|
| PATENT NO. | : 6,877,589 B2 |
| APPLICATION NO. | : 10/401815 |
| DATED | : April 12, 2005 |
| INVENTOR(S) | : Ikeda |

It is certified that error appears in the above-identified patent and that said Letters Patent is hereby corrected as shown below:

The title page showing the print figure should be deleted, and replaced with the attached amended title page.
Drawing sheet, consisting of Fig. 1, should be deleted and replaced with the drawing sheet, consisting of Fig. 1, as shown on the attached page.
Cancel Fig. 12.

Please amend column 2, line 54 through column 3, line 17 to read as follows:

In order to achieve the above-objects, this invention provides a drum brake device with an automatic shoe clearance adjustment apparatus comprising: a first brake shoe and a second brake shoe facing each other; a service brake actuator positioned between first adjacent ends of the brake shoes; a shoe return inhibitor, for restricting return positions of the brake shoes, positioned adjacent to the service brake actuator and extended between the brake shoes, the shoe return inhibitor automatically displaces the return positions of the brake shoes in the outward direction of the brake shoes when an extent of the outward movement of the brake shoes, during the service brake operation, exceeds a predetermined distance, wherein a lever element is pivotally supported at the first brake shoe in a crossing direction relative to the shoe return inhibitor, one end of the shoe return inhibitor functionally engaging with a position of the lever element between a pivoting section and a free end of the lever element while the free end side of the lever element is supported by the first brake shoe via a thermo-sensitive member; and when the service brake is activated and the temperature of the thermo-sensitive member reaches the predetermined range, a rotational force is applied to the lever element because of a thermo-deformation of the thermo-sensitive member, thereby making the shoe return inhibitor follow an outward movement of second brake shoe so as to suspend an automatic shoe clearance adjustment.
 The lever element is a brake lever for parking brake operation or a radial contraction lever for contracting a diameter of the brake shoes in cooperation with the supporting member.

(12) United States Patent
Ikeda

(10) Patent No.: US 6,877,589 B2
(45) Date of Patent: Apr. 12, 2005

(54) DRUM BRAKE DEVICE WITH AN AUTOMATIC SHOE CLEARANCE ADJUSTMENT APPARATUS

(75) Inventor: Takashi Ikeda, Owariasahi (JP)

(73) Assignee: Nisshinbo Ind. Inc., Tokyo (JP)

(*) Notice: Subject to any disclaimer, the term of this patent is extended or adjusted under 35 U.S.C. 154(b) by 53 days.

(21) Appl. No.: 10/401,815

(22) Filed: Mar. 27, 2003

(65) Prior Publication Data

US 2003/0183465 A1 Oct. 2, 2003

(30) Foreign Application Priority Data

Mar. 27, 2002 (JP) .................................. 2002-089026

(51) Int. Cl.$^7$ ................................................ F16D 51/00
(52) U.S. Cl. ................................................ 188/79.52
(58) Field of Search ........................ 188/79.52, 79.51, 188/79.63

(56) References Cited

U.S. PATENT DOCUMENTS

| | | | | |
|---|---|---|---|---|
| 3,983,970 A | * | 10/1976 | Courbot | 188/79.52 |
| 4,390,086 A | * | 6/1983 | Conrad | 188/79.52 |
| 4,476,963 A | * | 10/1984 | Palmer et al. | 188/79.52 |
| 4,706,783 A | * | 11/1987 | Rath et al. | 188/79.52 |
| 4,706,784 A | * | 11/1987 | Shellhouse | 188/79.52 |
| 4,729,457 A | * | 3/1988 | Cousin et al. | 188/79.52 |
| 4,804,072 A | * | 2/1989 | Michoux et al. | 188/79.52 |
| 4,938,320 A | * | 7/1990 | Hyde et al. | 188/79.52 |
| 5,246,090 A | * | 9/1993 | Quere et al. | 188/79.52 |
| 5,343,987 A | * | 9/1994 | Varzescu | 188/79.63 |
| 6,196,360 B1 | * | 3/2001 | Iizuka et al. | 188/79.52 |
| 6,397,984 B1 | * | 6/2002 | De Andreis et al. | 188/79.52 |
| 6,508,339 B1 | * | 1/2003 | Asai et al. | 188/79.52 |

* cited by examiner

*Primary Examiner*—Benjamin A. Pezzlo
(74) *Attorney, Agent, or Firm*—Apex Juris, pllc; Tracy M Heims

(57) ABSTRACT

A drum brake device prevents shoe clearance overadjustment by means of a thermo-sensitive member with a lower leg opening force and provides a smaller thermosensitive member with a lower cost. A portion between both ends of the brake lever (50) in a direction of crossing the shoe return inhibitor (61) engages with one end of the shoe return inhibitor (61) automatically restricting the return position of the pair of brake shoes (20) and (30); the proximate portion (50a) of the brake lever (50) is pivotally supported on the brake shoe (20); and the free end (50b) side of the brake lever (50) is supported at the brake shoe (20) via the thermo-sensitive member (70).

4 Claims, 12 Drawing Sheets

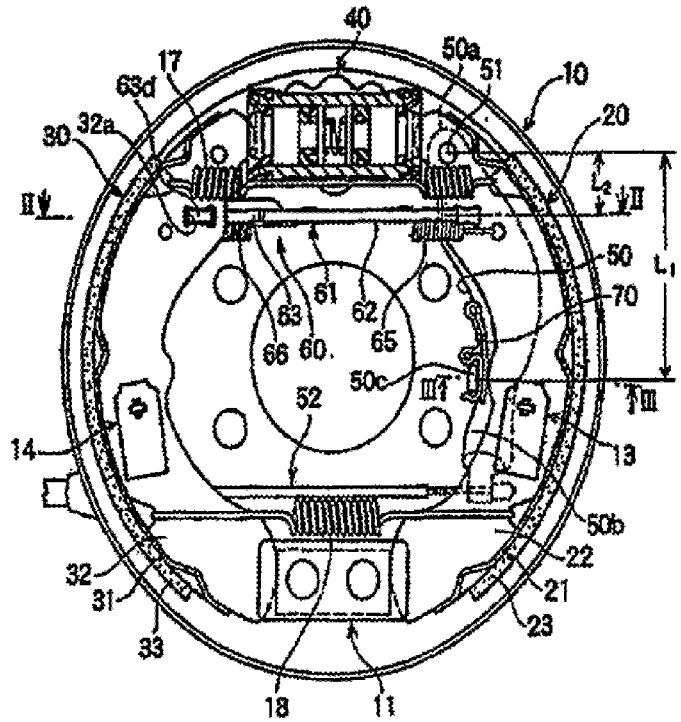

UNITED STATES PATENT AND TRADEMARK OFFICE
CERTIFICATE OF CORRECTION

| | |
|---|---|
| PATENT NO. | : 6,877,589 B2 |
| APPLICATION NO. | : 10/401815 |
| DATED | : April 12, 2005 |
| INVENTOR(S) | : Ikeda |

It is certified that error appears in the above-identified patent and that said Letters Patent is hereby corrected as shown below:

Please amend column 3, line 18 through 59 as follows.

The drum brake as structured above, arranging (positioning) the thermo-sensitive member at the free end side of the lever element, allows setting an opening force (force to move two legs of the thermo-sensitive member apart from each other) to the low magnitude apportioned by the lever-ratio at the position of the thermo-sensitive member, thereby enabling a smaller design for the thermo-sensitive member, thus minimizing material and thereby reducing the cost thereof.

The lever may be the brake lever for parking brake operation or the radial contraction lever for contracting the diameter of the brake shoes in cooperation with the supporting member, thereby broadening the applicability thereof to a variety of drum brakes. The automatic shoe clearance adjustment apparatus at least has the shoe return inhibitor, for restricting the return positions of the brake shoes and automatically displaces the brake shoes outward in the direction to move themselves apart from each other.

Figure 3:
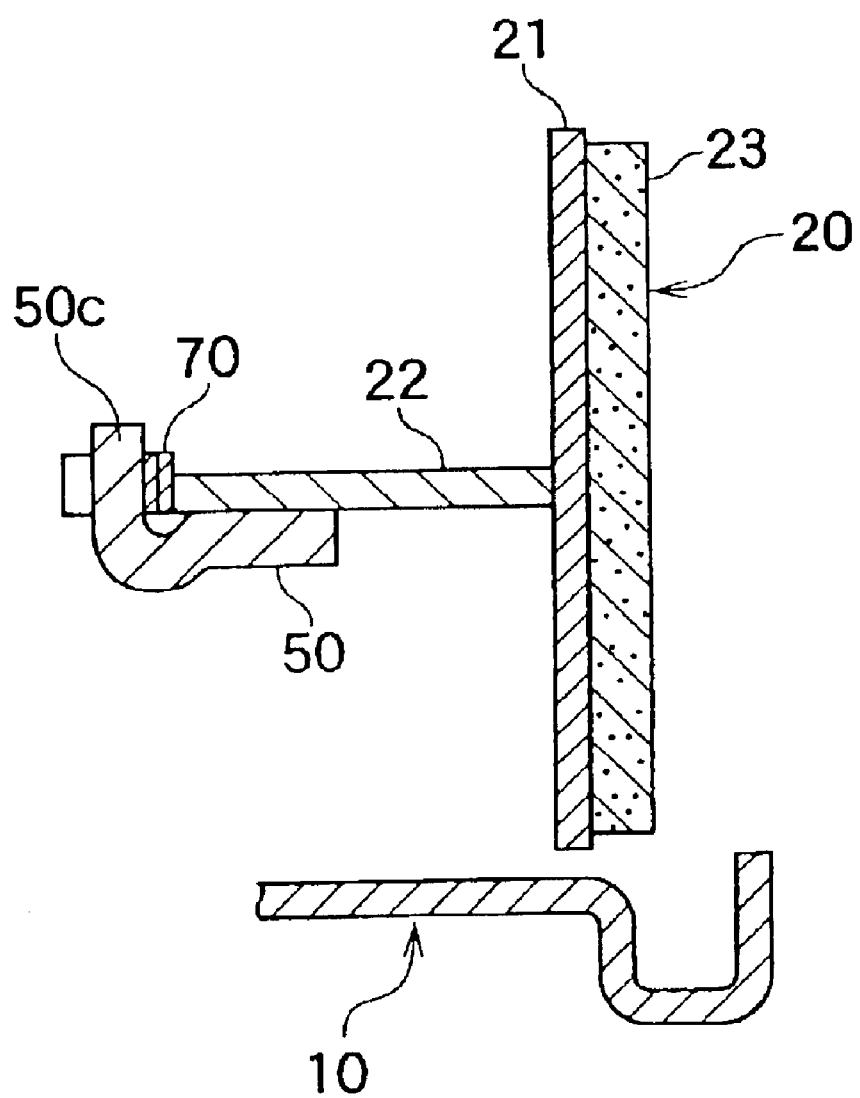
FIG. 3 is a cross-section view of FIG. 1 taken along the line III—III.

Please amend the column 3, line 65 through column 4, line 29 to read as follows:

BRIEF DESCRIPTION OF THE DRAWINGS
The above and other objects and advantages of the present invention will become readily apparent by reference to the following detailed description when considered in conjunction with the accompanying drawings:
Figure 1 is an outboard elevational view of the drum brake as to Example 1 of this invention;
Figure 2 is a cross-section view of Figure 1 taken along the line II-II;
Figure 3 is a cross-section view of Figure 1 taken along the line III-III;
Figure 4 is an enlarged isometric view explaining the thermo-sensitive member of the Example 1 of this invention;
Figure 5 is an outboard elevational view of the drum brake as to Example 2 of this invention;
Figure 6 is a cross-section view of Figure 5 taken along the line VI-VI;
Figure 7 is a cross-section view of Figure 5 taken along the line VII-VII;
Figure 8 is an enlarged isometric view explaining the thermo-sensitive member of the Example 2 of this invention;
Figure 9 is an outboard elevational view of the drum brake as to Example 3 of this invention;
Figure 10 is a cross-section view of Figure 9 taken along the line X-X; and
Figure 11 is an enlarged isometric view explaining the thermo-sensitive member of the Example 3 of this invention.

UNITED STATES PATENT AND TRADEMARK OFFICE
CERTIFICATE OF CORRECTION

PATENT NO. : 6,877,589 B2
APPLICATION NO. : 10/401815
DATED : April 12, 2005
INVENTOR(S) : Ikeda It is certified that error appears in the above-identified patent and that said Letters Patent is hereby corrected as shown below:

Please amend column 9, line 12 through column 10, line 8 to read as follows:

Accordingly, the abutment engagement between the tongue 15b and the radial contraction lever 90 is released, and the radial contraction lever 90 moves left in Figure 9 to enlarge the shoe-to-drum clearance, thereby facilitating the operation of removing the brake drum.
This invention is not limited to the structures described in Examples 1-3, and for example, the brake lever in Example 2 of this invention may be a radial contraction lever as described in Example 3; and an incremental type automatic shoe clearance adjustment apparatus, in which a shoe clearance adjustment strut having a screw-engagement mechanism may be extended between the lever mounted on one brake shoe and the other brake shoe end the adjustment lever sensing the brake shoe movement and automatically extend an entire length of the shoe clearance adjustment strut, may be employed.

Signed and Sealed this

Ninth Day of January, 2007

JON W. DUDAS
*Director of the United States Patent and Trademark Office*